3,118,780
CHROMATED LEAD OXIDE-SILICA PARTICLES
Edward J. Dunn, Jr., Port Washington, and Martin Kushner, Long Island City, N.Y., assignors to National Lead Company, New York, N.Y., a corporation of New Jersey
No Drawing. Filed Aug. 4, 1960, Ser. No. 47,397
9 Claims. (Cl. 106—297)

This invention relates to a novel pigmentary composition comprising silica-cored chromated lead oxide.

In particular, this invention relates to composite chromated lead oxide silica particles containing varying amounts of lead chromate and red lead having improved pigmentary properties.

Red lead has been used in large quantities for years in making metal protective coatings having good rust-inhibitive properties. This is attributed in part to the fact that red lead is basic in reaction. It has however been an expensive material to use and various expedients have been tried in the attempt to provide substitutes for red lead or means of extending the pigment in order to overcome the relatively high cost of red lead paints. One of the most successful proposals to date is embodied in copending application Serial No. 809,344, filed April 28, 1959, now U.S. Patent No. 3,050,408, and assigned to the assignee hereof. This copending application describes and claims a composite lead oxide-silica particle wherein said lead oxide may be red lead. The proportion of lead oxide to silica in the silica cored particle, may vary over a wide range of from 20% to 95% for an amount of silica of from 5% to 80% by weight based on the sum total of said particle. Such pigments have the advantage that the red lead is more efficiently utilized, because the core of the particle, which is normally not effective in providing corrosion inhibitive effects, consists of silica instead of expensive red lead. The silica-cored red lead pigments, in common with red lead pigments heretofore known to the art, consist (aside from the silica core) predominantly of "true red lead," $Pb_3O_4$, but inevitably contain some percentage of free, uncombined litharge or lead monoxide, PbO. The percentage of free litharge is low, often not exceeding a few percent. This small PbO content, however, is chemically active and has certain undesirable characteristics. Thus, the PbO is often reactive with paint vehicles causing storage difficulties such as "livering" and the like, and in addition, when the paint is exposed to the weather, the PbO tends to form lead carbonate resulting in early loss of gloss, formation of a white surface film which destroys the original color and which may also initiate premature breakdown of the film.

An object of this invention therefore is to provide an improved red lead pigment. Another object is to provide an improved extended red lead pigment composition. Still another object is to provide such a composition, which overcomes the undesired reactions attributable to the presence of free litharge in the composition. Other objects and advantages will become apparent from the following more complete description and claims.

Broadly, this invention contemplates a composite pigment particle having a silica core and a lead compound coating, said coating comprising lead chromate and being substantially devoid of free litharge.

The objects of this invention are attainable and the improved pigment of this invention produced by first preparing a lead oxide-coated silica composition, said composition containing both litharge and red lead, and subsequently converting the litharge component of said composition to lead chromate. If lead chromate is to be coated on a silica core, the starting lead oxide is litharge. To prevent the formation of lead silicate, the litharge will be chromated prior to the coating on the silica.

The lead oxide-coated silica may be produced, for example, by grinding silica in a ball mill, in aqueous slurry, with a lead oxide composition which comprises both red lead and litharge, and subsequently deliquoring the milled slurry and calcining the solids. If desired, additional litharge may be added in the ball-milling operation. When this is done, it is not essential that the red lead also contain litharge, although in the normal case, a certain amount of litharge is naturally present in the red lead.

For purposes of clarity, further mention of red lead, unless otherwise indicated, will be defined to mean lead oxide corresponding to the formula $Pb_3O_4$ that does not contain litharge.

If the proportion of litharge in the starting materials is greater than that equivalent to the proportion of lead chromate desired in the finished product, a portion of the litharge can be converted to red lead by calcining the lead oxide-coated silica composition for an appreciable length of time (dependent on the amount of conversion required) in an oxidizing atmosphere at a temperature between 470 and 500° C. Below 470° C., no appreciable conversion takes place, although the coating may be satisfactorily bound to the silica particles at temperatures as low as about 450° C. Therefore, if no conversion of litharge to red lead is desired, the calcination may be carried out in the temperature range 450–470° C., or in a non-oxidizing atmosphere, or both. The mass of silica-cored red lead particles may contain from 10% to 40% free litharge based on the weight of the composition.

After having produced a lead oxide-coated silica composition of the desired composition, the next step is to convert the litharge component of said composition to lead chromate. This is accomplished by forming a water slurry of the calcined lead oxide-coated silica composition and adding to said slurry chromic acid in amount to convert the litharge component to lead chromate, and then filtering and drying the product. The lead chromate formed may be normal lead chromate or monobasic lead chromate as desired, depending on the amount of chromic acid added relative to the amount of litharge present in the coated silica composition.

Although the above sequence of steps represents the preferred manner of making the pigments of this invention, it is also possible to produce them by first providing a litharge-red lead composition of the desired proportions, chromating the litharge component, and then grinding the chromated material with silica, deliquoring and calcining. In this sequence of operations, the steps are substantially the same and the calcination conditions given above for calcination of the lead oxide-coated silica composition apply equally well to the calcination of the litharge-red lead composition in this modification of the process. By reacting less than the stoichiometric amount of chromic acid when chromating a portion of the litharge, the litharge if desired may be converted to red lead during calcination. It is necessary to cocalcine the silica with the lead oxide, whether the latter has previously been chromated or not, in order to cause the lead compounds to adhere to the surface of the silica particle. As noted above, when the lead oxides are cocalcined with the silica and subsequently chromated, the calcination temperature may be from 450 to 500° C. Temperatures in excess of 500° C. should generally be avoided because they tend to produce sintering and particle growth, resulting in a harsh, gritty material of poor pigment properties. When the lead oxides are first chromated and subsequently applied to the silica, the temperature should be in the neighborhood of 465 to 485° C. to help bond the material to the silica core in an oxidizing atmosphere.

When a lead chromate coated silica pigment, not containing red lead, is desired, the litharge, devoid of red lead, is first chromated, forming a monobasic salt, the chromated material is ground with silica, deliquored and calcined. The calcination is carried on as previously described.

In order to more fully illustrate the nature of this invention and the manner of practicing the same, the following examples are presented.

EXAMPLE 1

Silica, 1400 grams, and 1440 grams of a mixture containing 90% red lead and 10% litharge are ground together in aqueous slurry containing 2000 ml. of water in a ball mill for 6 hours at room temperature. The slurry is deliquored and dried and the solid portion thereof calcined at 480 to 490° C. for 6 hours. The product is a soft powder and has the following analysis:

|  | Percent |
|---|---|
| $SiO_2$ | 50 |
| PbO | 2 |
| $Pb_3O_4$ | 48 |

This product is slurried in 12 liters of water at room temperature in a suitable vessel. 12.5 grams of chromic acid dissolved in 110 cc. of water are slowly dropped into the suspension over a 1 hour period. The product is filtered and dried at 100° C., and is found to consist essentially of silica-cored pigment particles wherein the coating on the silica is predominantly red lead and contains a minor proportion of monobasic lead chromate, and is substantially devoid of free litharge.

The same procedural steps carried out in the inverse order, by first reacting the red lead (containing free litharge) with chromic acid in the aqueous slurry, and subsequently forming a slurry of the product with silica and deliquoring and calcining the silica-containing slurry, give substantially identical results, except that the proportion of lead chromate in the product is higher. This is a reflection of the fact that when free litharge is calcined at temperatures between 470 and 500° C., a portion thereof is converted to red lead and is therefore not available for reaction with the chromic acid. When the reaction between litharge and chromic acid is carried out before the calcination step, that portion of the litharge which otherwise would have been converted to red lead has already been converted to lead chromate. Calcination in this case simply helps to adhere the coating to the silica.

EXAMPLE 2

Red lead-lead chromate coated silica and monobasic lead chromate coated silica pigments possess excellent rust inhibitive and blistering resistance properties. The pigments were compared to mechanical mixtures of red lead-lead chromate and silica and to lead chromate. Table I gives the paint formulations that were applied at 1.5 mils dry film thickness per coat on the sandblasted steel panels.

Table I

FORMULATIONS OF METAL PROTECTIVE PAINTS

|  | Control 1 | Test 1 | Control 2 | Test 2 |
|---|---|---|---|---|
| Percent Pigment | 52.2 | 62.2 | 60.0 | 61.3 |
| Red lead (97%)..........lbs/100 gal.. | 21.1 |  |  |  |
| Lead Chromate...............do.... | 5.7 |  | 99.4 |  |
| Ground quartz.................do.... | 71.8 |  |  |  |
| Red lead-lead chromate coated silica lbs/100 gal.. |  | 99.0 |  |  |
| Lead chromate coated silica...do.... |  |  |  | 99.0 |
| Bentone 34.....................do.... | 1.4 | 1.0 | 0.6 | 1.0 |
| Percent Vehicle................ | 47.8 | 36.8 | 31.0 | 38.7 |
| #555 P.H.B. linseed oil...lbs/100 gal.. | 17.9 | 18.5 | 14.4 | 18.3 |
| Raw linseed oil..................do.... | 51.8 | 53.3 | 41.6 | 52.8 |
| Solvents and Driers..............do.... | 30.3 | 28.2 | 44.0 | 28.9 |

Bentone 34 is an organophilic bentonite prepared by the reaction of bentonite with an aliphatic quarternary ammonium salt. #555 P.H.B. linseed oil is a pale heat bodied linseed oil.

Table II shows the results found following eleven months atmospheric exposure on sandblasted steel panels. One coat of primer paint was applied.

Table II

ATMOSPHERIC CORROSION RESISTANCE—11 MONTHS' EXPOSURE

| Paint | Pigment | Corrosion Rating |
|---|---|---|
| Control 1 | Red lead-lead chromate and silica mechanical mixture. | 7 |
| Test 1 | Red lead-lead chromate coated silica. | 10 |
| Control 2 | Lead chromate. | 8 |
| Test 2 | Monobasic lead chromate coated silica. | 10 |

The corrosion resistance test and numerical ratings of Table II are based on physical appearance. A rating of 10 is perfect and 0 for complete failure.

The results show that the coated silica pigments are superior, with perfect ratings of 10 each, as compared to the controls having values of 7 and 8. It is significant to note that test 2 contained only half the active ingredients found in control 2.

Table III gives the formulations in alkyd vehicles. These paints were exposed to the atmosphere and half tide.

Table III

FORMULATIONS OF METAL PROTECTIVE PAINTS

|  | Control 3 | Test 3 | Control 4 | Control 5 | Test 4 |
|---|---|---|---|---|---|
| Percent Pigment | 47.9 | 47.1 | 60.8 | 49.7 | 47.5 |
| Lead chromate......lbs/100 gal.. | 48.4 |  | 99.1 | 37.5 |  |
| Ground quartz.............do.... | 50.2 |  |  | 47.4 |  |
| Lead chromate coated silica lbs/100 gal.. |  | 98.5 |  |  |  |
| Red lead (97%)...........do.... |  |  |  | 13.8 |  |
| Red lead-lead chromate coated silica.............lbs/100 gal.. |  |  |  |  | 98.6 |
| Bentone 34...............do.... | 1.4 | 1.5 | 0.9 | 1.3 | 1.4 |
| Percent Vehicle............. | 52.1 | 52.9 | 39.2 | 50.3 | 52.5 |
| Alkyd resin solution 2458 lbs/100 gal.. | 83.2 | 81.7 | 78.9 | 84.9 | 76.8 |
| Solvents and driers........do.... | 16.8 | 18.3 | 21.1 | 15.1 | 23.2 |

The alkyd resin used was a medium oil length alkyd resin solution comprising 50% non-volatile solids. The solids show approximately 32% phthalic anhydride, 49% fatty acids and the remaining 19% polyhydroxy alcohols and modifiers.

Table IV shows the results found after an atmospheric exposure of 11 months on sandblasted steel panels using one coat of primer.

Table IV
ATMOSPHERIC CORROSION RESISTANCE—11 MONTHS' EXPOSURE

| Paint | Pigment | Corrosion Rating |
|---|---|---|
| Control 3 | Lead Chromate and Silica Mechanical Mixture. | 9 |
| Test 3 | Monobasic Lead Chromate Coated Silica | 10 |

The results demonstrate, that although control 3 had a high corrosion rating of 9 after 11 months' exposure, the invention, test 3, had a perfect rating of 10 after the same period of time.

Table V lists the results of the half tide exposure for corrosion resistance and blistering resistance. The following painting system was used on sandblaster hot rolled steel panels: 2 coats primer over all, finish coat over all. The finish coat used on all panels was gray paint meeting the requirements of U.S. Government Specification MIL–P–1513a in an alkyd vehicle. All paints were applied at 1.5 mils dry film thickness per coat. The blistering resistance test was conducted according to a rating system of 10 if perfect and 0 if complete failure; S designates a blister size of approximately 1/16″, M approximately 3/16″ and L of larger then 1/4″.

Table V
HALF TIDE BLISTERING AND CORROSION RESISTANCE 10 MONTHS' EXPOSURE

| Paint | Pigment | Blistering Rating | Corrosion Rating |
|---|---|---|---|
| Control 4 | Lead Chromate | 8 L | 8 |
| Test 3 | Lead Chromate coated silica | 9 S | 9 |
| Control 5 | Red lead-lead chromate and silica mechanical mixture. | 7 M | 8 |
| Test 4 | Red lead-lead chromate coated silica. | 9 S | 9 |

The test pigments were superior both in corrosion and blister resistance as compared to the control pigments; 9 as compared to 8 in corrosion resistance and 9 S as compared to 7 M and 8 L in blistering resistance.

Table VI gives the formulations in phenolic vehicles. These paints were exposed to the atmosphere and half tide.

Table VI
FORMULATIONS OF METAL PROTECTIVE PAINTS

| | Control 6 | Test 5 | Control 7 | Test 6 |
|---|---|---|---|---|
| Percent pigment | 58.9 | 57.9 | 59.5 | 57.6 |
| Lead Chromate lbs./100 gal. | 48.5 | | 37.7 | |
| Ground quartz do | 50.4 | | 47.5 | |
| Lead chromate coated silica do | | 98.8 | | |
| Red Lead do | | | 13.7 | |
| Red lead-lead chromate coated silica do | | | | 98.1 |
| Bentone 34 do | 1.1 | 1.2 | 1.1 | 1.9 |
| Percent Vehicle | 41.1 | 42.1 | 46.5 | 42.4 |
| Phenolic Varnish lbs./100 gal. | 87.9 | 85.2 | 86.2 | 78.4 |
| Solvents and Driers do | 12.1 | 14.8 | 13.8 | 21.6 |

The phenolic varnish consisted of 25 gallons of tung oil modified with 100 pounds of Bakelite resin 4036. The resin 4036 is a para-tert-amylphenolformaldehyde resin. The varnish was approximately 60% solids by weight diluted with mineral spirits.

Table VII shows the results found after atmospheric exposure for 10 months on sandblasted steel panels using one coat of primer.

Table VII
ATMOSPHERIC CORROSION RESISTANCE—10 MONTHS' EXPOSURE

| Paint | Pigment | Corrosion Rating |
|---|---|---|
| Control 6 | Lead chromate and silica mechanical mixture. | 7 |
| Test 5 | Monobasic lead chormate coated silica | 8 |

Table VIII shows the results after half tide exposure for 10 months on sandblasted hot rolled steel panels using a painting system of 2 coats primer, 1 finish coat over all.

Table VIII
HALF TIDE CORROSION AND BLISTERING RESISTANCE— 10 MONTHS' EXPOSURE

| Paint | Pigment | Corrosion Rating | Blister Rating |
|---|---|---|---|
| Control 7 | Red lead-lead chromate and silica mechanical mixture. | 6 | 6 L |
| Test 6 | Red lead-lead chromate coated silica. | 8 | 8 L |

While this invention has been described in terms of certain specific embodiments and illustrated by way of specific examples, these are illustrative only and the invention is not to be construed as limited except as set forth in the following claims.

We claim:

1. A composite pigment particle having a silica core and a lead compound coating, said coating selected from the group consisting of monobasic lead chromate, monobasic lead chromate and red lead, and normal lead chromate and red lead, said silica present from about 3.5% to about 80% based on the total weight of said particle, said particle being substantially devoid of free litharge and lead silicate.

2. A composite pigment particle having a silica core and a lead compound coating consisting essentially of monobasic lead chromate, said silica present from about 3.5% to about 80% based on the total weight of said particle, said particle being substantially devoid of free litharge and lead silicate.

3. A composite pigment particle having a silica core and a lead compound coating consisting essentially of monobasic lead chromate and red lead, said silica present from about 3.5% to about 80% based on the total weight of said particle, said particle being substantially devoid of free litharge and lead silicate.

4. A composite pigment particle having a silica core and a lead compound coating consisting essentially of normal lead chromate and red lead, said silica present from about 3.5% to about 80% based on the total weight of said particle, said particle being substantially devoid of free litharge and lead silicate.

5. Method of making a composite pigment particle comprising the steps of preparing a slurry of silica and at least one lead oxide, said lead oxide being present in amount from 20% to 95%, including at least 5% red lead, grinding said slurry for at least 4 hours, deliquoring said slurry, calcining the solid portion thereof for at least 2 to 8 hours at a temperature of from 450° C. to 500° C., the time and temperature of calcination being so related that the solid portion contains red lead throughout calcination thereby producing a silica-cored lead oxide particle wherein at least a portion of said lead oxide is litharge, forming a water slurry of said silica-cored lead oxide, adding to said slurry chromic acid in amount to convert all of said litharge to a lead chromate, filtering and drying the product.

6. An oil based metal protective paint composition comprising as pigment therefor, a composite pigment particle having a silica core and a lead compound coating, said coating selected from the group consisting of monobasic lead chromate, monobasic lead chromate and red lead, and normal lead chromate and red lead, said silica present from about 3.5% to about 80% based on the total weight of said particle, said particle being substantially devoid of free litharge and lead silicate.

7. An oil based metal protective paint composition comprising as pigment therefor, a composite pigment particle having a silica core and a lead compound coating consisting essentially of monobasic lead chromate, said silica present from about 3.5% to about 80% based on the total weight of said particle, said particle being substantially devoid of free litharge and lead silicate.

8. An oil based metal protective paint composition comprising as pigment therefor, a composite pigment particle having a silica core and a lead compound coating consisting essentially of monobasic lead chromate and red lead, said silica present from about 3.5% to about 80% based on the total weight of said particle, said particle being substantially devoid of free litharge and lead silicate.

9. An oil based metal protective paint composition comprising as pigment therefor, a composite pigment particle having a silica core and a lead compound coating consisting essentially of normal lead chromate and red lead, said silica present from about 3.5% to about 80% based on the total weight of said particle, said particle being substantially devoid of free litharge and lead silicate.

References Cited in the file of this patent
UNITED STATES PATENTS

| | | |
|---|---|---|
| 2,391,118 | Barton | Dec. 18, 1945 |
| 2,597,645 | Kebrich | May 20, 1952 |
| 2,668,122 | Pitrot | Feb. 2, 1954 |
| 3,050,408 | Orsino et al. | Aug. 21, 1962 |